United States Patent [19]
Glennon

[11] Patent Number: 5,929,537
[45] Date of Patent: Jul. 27, 1999

[54] PMG MAIN ENGINE STARTER/GENERATOR SYSTEM

[75] Inventor: Timonthy F. Glennon, Rockford, Ill.

[73] Assignee: Sundstrand Corporation, Rockford, Ill.

[21] Appl. No.: 08/885,312

[22] Filed: Jun. 30, 1997

[51] Int. Cl.$^6$ ........................................................ H02J 1/12
[52] U.S. Cl. ............................ 307/46; 307/44; 307/64; 307/80; 307/82
[58] Field of Search .................................. 307/43, 44, 45, 307/46, 64, 65, 66, 80, 82, 85, 86, 87; 322/28, 46; 318/139, 140, 151, 152, 153

[56] References Cited

U.S. PATENT DOCUMENTS

| | | | |
|---|---|---|---|
| 2,908,776 | 10/1959 | Nolden et al. | 200/4 |
| 3,132,297 | 5/1964 | Erikson | 322/59 |
| 3,519,843 | 7/1970 | Trautman | 307/65 |
| 3,555,290 | 1/1971 | Ellermeyer | 306/65 |
| 4,356,402 | 10/1982 | Morimoto et al. | 307/19 |
| 4,467,220 | 8/1984 | Page | 307/19 |
| 4,638,175 | 1/1987 | Bradford et al. | 307/64 |
| 4,659,942 | 4/1987 | Volp | 307/19 |
| 4,743,776 | 5/1988 | Baehler et al. | 290/31 |
| 4,830,412 | 5/1989 | Raad et al. | 290/31 |
| 4,862,342 | 8/1989 | Dhyanchand et al. | 363/40 |
| 5,036,267 | 7/1991 | Markunas et al. | 322/10 |
| 5,055,764 | 10/1991 | Rozman et al. | 322/10 |
| 5,266,838 | 11/1993 | Gerner | 307/19 |
| 5,309,081 | 5/1994 | Shah et al. | 322/10 |

*Primary Examiner*—Jeffrey Gaffin
*Assistant Examiner*—Jonathan S. Kaplan
*Attorney, Agent, or Firm*—Marshall, O'Toole, Gerstein, Murray & Borun

[57] ABSTRACT

A starting/generating system for a small aircraft having engines which can be battery started includes a permanent magnet generator (PMG) which can directly supply frequency-insensitive loads and a power converter for developing regulated DC power from the output of the PMG.

16 Claims, 3 Drawing Sheets

PMG MAIN ENGINE STARTER/GENERATOR SYSTEM

TECHNICAL FIELD

The present invention relates generally to starting/generating systems, and more particularly to a starting/generating system for an aircraft.

BACKGROUND ART

In a small business aircraft, a DC starter/generator is utilized in a starting mode to convert DC power supplied by a battery into motive power for starting main engines. Thereafter, the starter/generator is operable in a generating mode to provide up to a maximum current rating at a particular voltage, such as 200–400 amps at 28 volts DC. Engine start power requirements have grown over time, resulting in increasing unreliability of the DC starter/generator. In addition, loads have also increased, leading to the need to add a separate wound-field AC generator to the engine to supply a portion of the loads. This, in turn, results in the need for two gear box pads to drive the two types of generators. Further, the DC starter/generator is a source of high life cycle costs due to maintenance of the brushes thereof.

The addition of a further machine to the engine gear box to supply power to loads results in reduced reliability of the overall system.

SUMMARY OF THE INVENTION

A main engine starting generating system eliminates both the DC starter/generator and the AC generator of the conventional system and replaces same with a permanent magnet generator (PMG) and associated electronics. Weight is thus decreased and reliability is improved as compared with existing systems.

More particularly, a starting/generating system for use with a prime mover and operable in a starting mode to start the prime mover and further operable in a generating mode to develop power for loads includes a PMG having a motive power shaft coupled to the prime mover and further having a winding, a bidirectional power converter having first and second inputs and a DC power bus coupled to the power converter first input/output. A DC power source is coupled to the first power bus and an AC power bus is coupled between the power converter second input/output and the PMG winding. A converter control is coupled to the power converter wherein the converter control causes the power converter to convert power delivered by the DC power source to the DC power bus into power for the PMG during operation in the starting mode. The converter control causes the power converter to convert power developed by the PMG on the AC power bus into power for the DC power bus during operation in the generating mode.

Preferably, the power converter includes an inverter coupled to the PMG winding and a bidirectional DC-DC converter coupled between the inverter and the DC power bus.

Also preferably, the DC-DC converter comprises a transformer having first and second windings, a first pair of controllable power switches coupled to ends of the first winding, a second pair of controllable power switches coupled to the ends of the second windings, and diodes coupled across the controllable power switches.

Still further in accordance with the preferred embodiment, the inverter includes controllable power switches coupled to the PMG winding and further coupled across DC conductors. In addition, contactors may be provided for selectively coupling the PMG to an AC load during operation in the generating mode.

In accordance with alternative embodiments, the DC-DC converter is operated in a pulse-width-modulated mode of operation or a quasi square wave mode of operation.

In accordance with a further aspect of the present invention, a starting/generating system for use with an aircraft engine and operable in a starting mode to start the aircraft engine and further operable in a generating mode to develop power for aircraft loads includes a PMG having a motive power shaft coupled to the aircraft engine and further having a set of polyphase windings. An inverter is coupled to the set of PMG polyphase windings and a bidirectional DC-DC converter is coupled to the inverter. A DC bus is coupled to the DC-DC converter and a battery is coupled to the DC bus. A converter control is coupled to the inverter and causes the DC-DC converter and the inverter to convert DC power provided by the battery into AC power for the PMG during operation in the starting mode. The converter control further causes the inverter and the DC-DC converter to develop DC power for the power bus during operation in the generating mode.

In accordance with yet another aspect of the present invention, a starting/generating system for use with an aircraft engine and operable in a starting mode to start the aircraft engine and further operable in a generating mode to develop power for aircraft loads includes a PMG having a motive power shaft coupled to the aircraft engine and further having a set of polyphase windings and an inverter including controllable power switches coupled across DC conductors. A bidirectional DC-DC converter is coupled to the DC conductors and includes a transformer having first and second windings, a first pair of controllable power switches coupled to ends of the first winding, a second pair of controllable power switches coupled to ends of the second windings and diodes coupled across the controllable power switches. A DC bus is coupled to the DC-DC converter and a battery is coupled to the DC bus and develops a battery voltage. The DC-DC converter steps up the battery voltage in the starting mode and further produces a substantially constant DC voltage on the DC bus during operation in the generating mode. Contactors are coupled between the PMG and AC loads, and means are provided for closing the contactors during operation in the generating mode so that power developed by the PMG is delivered to the AC loads. A converter control is coupled to the inverter wherein the converter control causes the DC converter and the inverter to convert DC power provided by the battery into AC power for the PMG during operation in the starting mode. The converter control further causes the inverter and the DC-DC converter to develop DC power for the power bus during operation in the generating mode.

Other features and advantages are inherent in the apparatus claimed and disclosed or will become apparent to those skilled in the art from the following detailed description in conjunction with the accompanying drawings.

DESCRIPTION OF THE PREFERRED EMBODIMENTS

Figure 1:
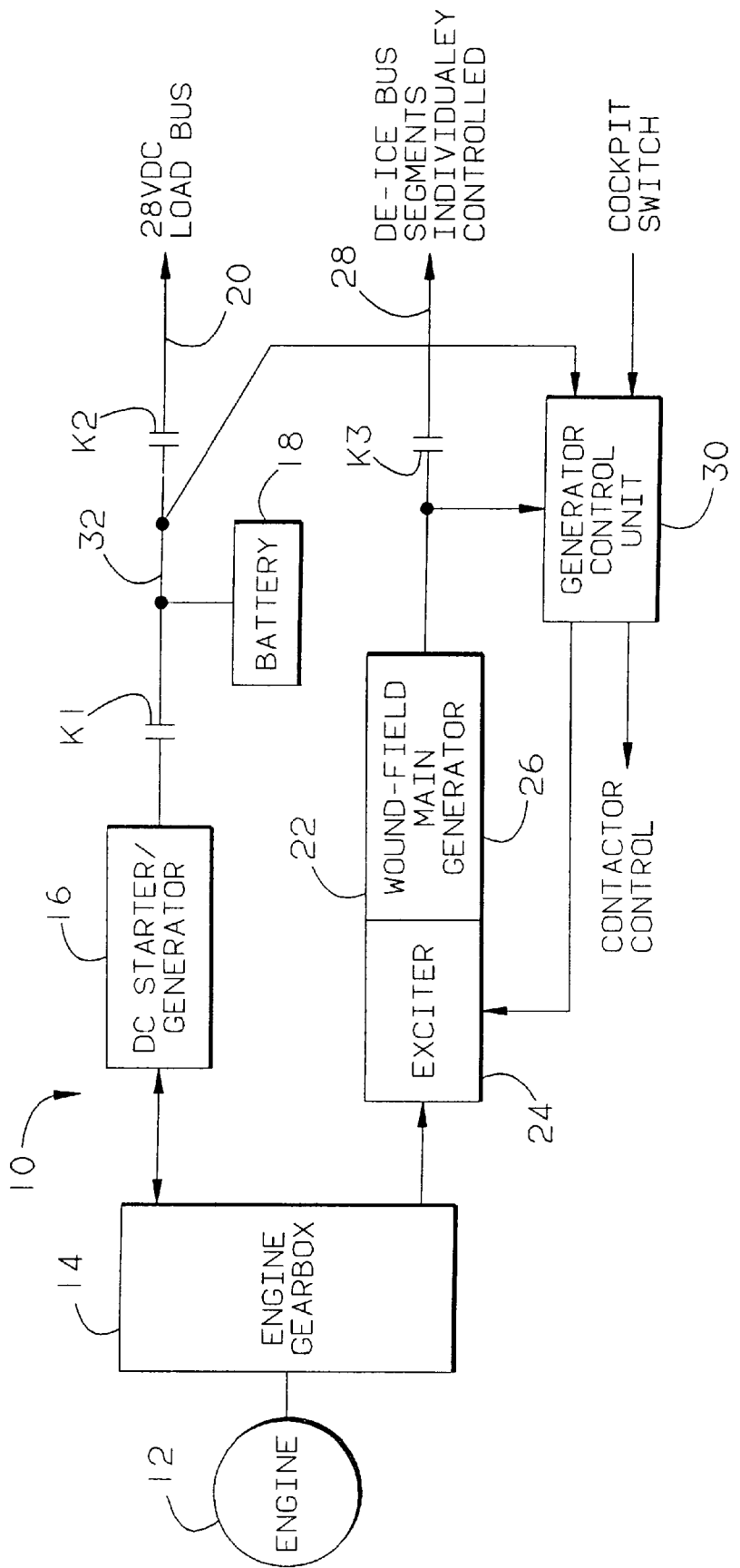
FIG. 1 comprises a simplified block diagram of a prior art starting/generating system.

FIG. 1 illustrates a prior art starting/generating system 10 which may be used in, for example, a small business aircraft. A prime mover in the form of an aircraft jet engine 12 is coupled to a first pad of an engine gear box 14. A DC starter/generator 16 is coupled to the engine gear box 14. During operation in a starting mode, the DC starter/generator 16 receives DC power developed by a battery 18 or other DC power source via contactors K1 such that the starter/generator 16 is operated as a motor to provide motive power to the engine 12. Once self-sustaining speed is achieved, the jet engine 12 may thereafter supply motive power to the DC starter/generator 16 during operation in a generating mode to cause it to develop DC power which is supplied by the contactors K1 and a further set of contactors K2 to a DC load bus 20.

The system 10 further includes an AC generator 22 having an exciter portion 24 and a wound-field main generator portion 26. A rotor of the AC generator 22 is coupled to a second pad of the engine gear box 14 and develops AC power which is coupled by a set of contactors K3 to frequency-insensitive loads, such as de-ice segments or elements, over a bus 28. It should be noted that, while single lines between elements are shown in the Figs. (such as the line 28), in reality each may consist of a number of conductors (such as three), one for each phase of AC power.

A generator control unit (GCU) 30 is responsive to the DC power on a line 32 between contactors K1 and K2 and further is responsive to the state of a switch located in the aircraft cockpit (not shown) and provides regulated power to the exciter 24.

The GCU 30 also controls the contactor sets K1–K3 in the starting and generating modes such that, in the starting mode, the contactors K1 are closed and the contactor sets K2 and K3 are opened and such that the contactor sets K1–K3 are all closed during operation in the generating mode.

Figure 2:
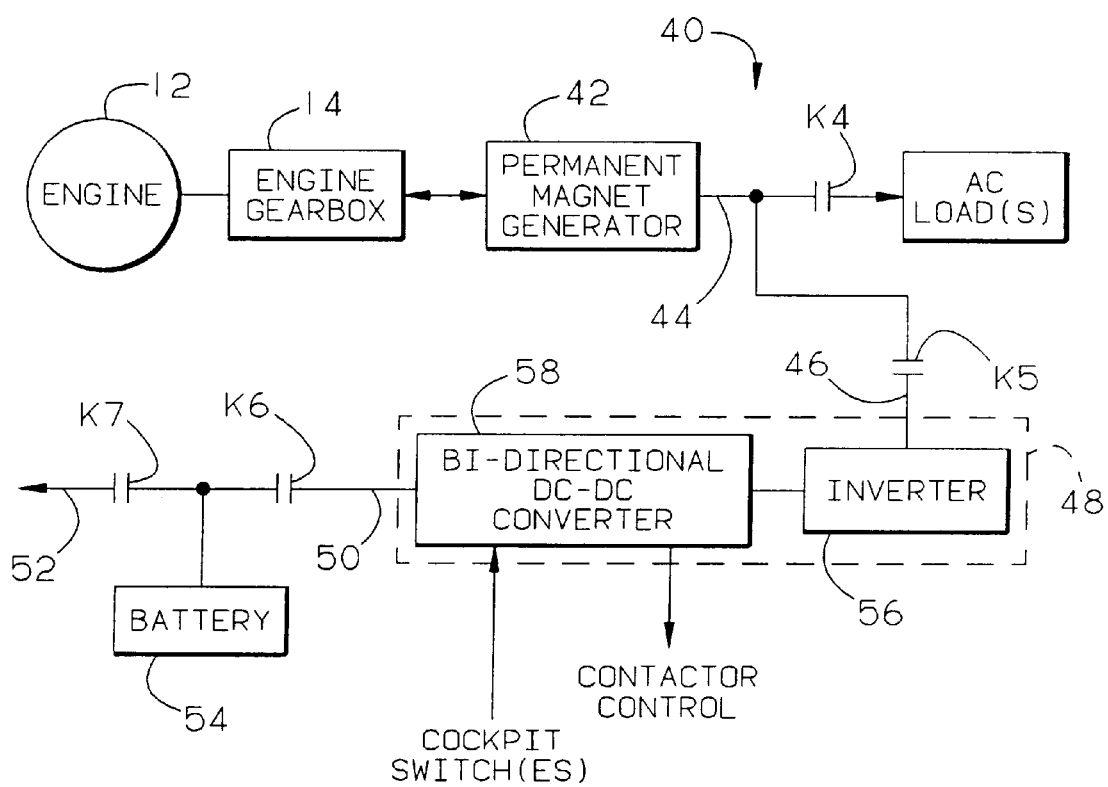
FIG. 2 comprises a block diagram of a starting/generating system according to the present invention.

FIG. 2 illustrates a starting/generating system 40 according to the present invention which is coupled to the engine 12 and gear box 14. In this system, a permanent magnet generator (PMG) 42 is coupled to a single pad of the gear box 14 and supplies power to the various loads. Specifically, the PMG 42 is coupled to a set of single or polyphase lines or conductors 44 forming an AC power bus 44. In the preferred embodiment, the PMG 42 develops three-phase power which is coupled by the lines 44 to contactor sets K4 and K5. The contactor set K4 is in turn coupled to a set of variable voltage/variable frequency AC loads, such as de-ice segments, galley loads, etc. The contactor set K5 is coupled to a first set of inputs/outputs 46 of a power converter 48. The power converter 48 includes a second set of input/outputs 50 which are in turn coupled by contactor sets K6 and K7 to conductors or lines forming a DC load bus 52. A battery 54 or other DC power source is coupled to conductors intermediate the contactors K6 and K7.

The power converter 48 comprises an inverter 56, which is capable of bidirectional power flow, and a bidirectional DC-DC converter 58 coupled to the inverter 56. The inverter 56 includes an inverter control which operates switches in the inverter 56. In addition, the DC-DC converter 58 includes a converter control which controls switches in the converter 58 in response to the state of a switch or switches in the cockpit (not shown) of the aircraft. Further, the bidirectional DC-DC converter 58 includes controls to operate the contactors K4–K7 in response to system status and protection functions and cockpit switch commands. During operation in the starting mode, the contactors K4 and K7 are opened while the contactors K5 and K6 are closed. DC power is supplied by the battery through the contactor set K6 to the bidirectional DC-DC converter 58, which steps up the DC voltage to a level of, for example, approximately 150 to 270 volts DC. During this time, the inverter 56 is operated by the inverter control to develop AC power of suitable waveshape to cause the PMG 42 to operate as a motor and bring the engine 12 up to self-sustaining speed. Significantly, the system 10 does not require a position sensor for the PMG 42, inasmuch as voltage and frequency can be slowly applied at stall at the beginning of the starting sequence. Position or speed sensing may be required, however, if in-flight restart capability at a variety of PMG speeds is to be implemented.

If desired, power for starting may be supplied by an external power source, such as a ground power cart, in which case additional contactors would be required.

During operation in the generating mode, all of the contactors K4–K7 are closed by the DC-DC converter 58, provided there is no load shorts or other faults occurring. AC power on the AC bus 44 is supplied to the AC loads and the inverter 56 rectifies the AC power into DC power and the DC power is level shifted to a voltage of, for example, 28 volts DC by the DC-DC converter 58. This DC power may be supplied on the DC bus 52 to one or more DC loads and, if desired, may be used to charge the battery 54.

Figure 3:
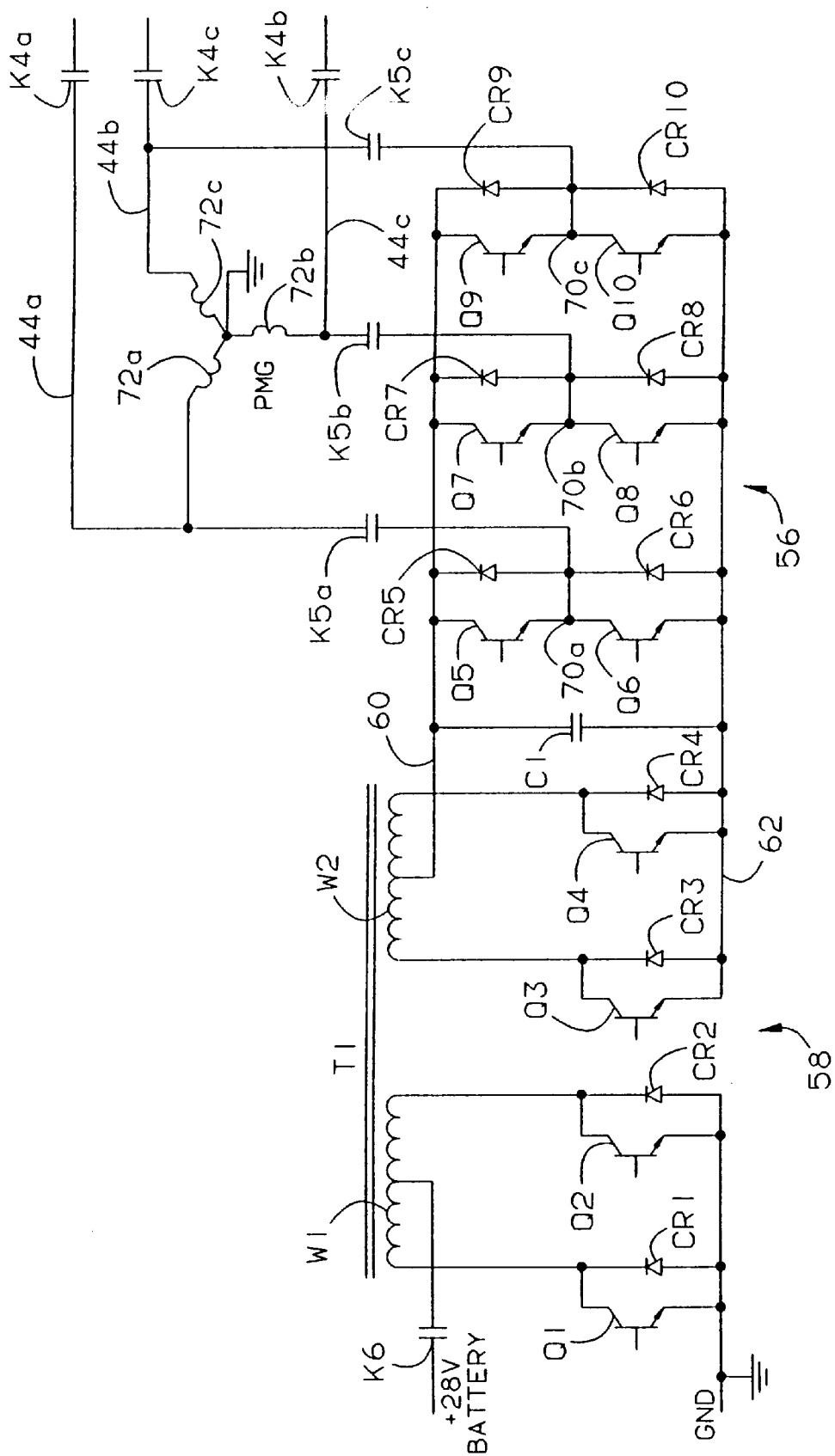
FIG. 3 comprises a schematic diagram of the bidirectional converter and inverter of FIG. 2.

FIG. 3 illustrates the inverter 56 and the DC-DC converter 58 in greater detail. The DC-DC converter 58 includes first and second pairs of controllable power switches Q1, Q2 and Q3, Q4. The controllable power switches Q1–Q4 may comprise power MOSFET arrays, IGBT's or any other controllable switches of suitable power rating. A flyback/rectifier diode CR1–CR4 is coupled across each of the switches Q1–Q4, respectively. The power switches Q1 and Q2 are coupled to first and second ends, respectively, of a first winding W1 of a transformer T1. The switches Q3 and Q4 are coupled to first and second ends of a second winding W2 of the transformer T1 which is magnetically linked with the first winding W1. A mid-tap of the first winding W1 is coupled by the contactors K6 to the battery 54. A mid-tap of the second winding W2 is coupled to a first DC conductor 60, which is in turn coupled together with a second DC conductor 62 to the inverter 56. A capacitor C1 is coupled across the DC conductor 60, 62 to provide transient suppression and a small amount of energy storage for PWM filtering.

The inverter 56 comprises pairs of controllable power switches Q5, Q6 and Q7, Q8 and Q9, Q10 which are coupled in a conventional three-phase bridge configuration across the DC conductors 60 and 62. Again, the power switches Q5–Q10 may be power MOFSET arrays, IGBT's or any other controllable switch of suitable power rating. Flyback/rectifier diodes CR5–CR10 are coupled across the controllable switches Q5–Q10, respectively. Contacts K5a–K5c of the contactor K5 are coupled to junctions 70a, 70b and 70c between the switches of each pair. The contacts K5a–K5c are further coupled to armature windings 72a–72c, respectively, of the PMG 42. Contacts K4a–K4c of the contactor K4 are coupled between conductors 44a–44c of the AC bus 44 (which are coupled to the PMG armature windings 72a–72c, respectively,) and the AC load(s).

During operation in the starting mode, the switches Q1 and Q2 are alternately operated in a pulse-width modulated (PWM) or quasi-square wave mode of operation at a selected frequency of, for example, 20 KHz. AC power is thereby developed across the winding W1, in turn causing a corresponding AC waveform to be developed across the winding W2. This AC power is rectified by the diodes CR3 and CR4 to develop DC power across the DC conductors 60 and 62. The controllable power switches Q5–Q10 are operated in a pulse-width modulated mode of operation to bring the PMG 42, and thus the aircraft engine 12, up to speed in a controlled fashion, such as in a nearly constant volt-second/cycle mode of operation.

During operation in the generating mode, AC power developed in the armature windings 72a–72c of the PMG 42 is rectified by the diodes CR5–CR10 to develop DC power across the DC conductors 60 and 62. During this time the switches Q5–Q10 are preferably off. Alternatively, the switches Q5–Q10 can be operated to form a controlled voltage active rectifier circuit. The controllable power switches Q3 and Q4 in the DC-DC converter 58 are alternately operated in a PWM mode to convert the DC power 60 appearing across the DC conductors 60 and 62 into intermediate AC power across the winding W1 and to regulate the output of the DC-DC converter 28. During operation in the generating mode, the switches Q1 and Q2 are maintained in an off condition, and the intermediate AC power is rectified by the diodes CR1 and CR2. The resulting DC power is supplied by the contactors K6 to the battery 54 and by the contactors K7 to the DC loads 52.

In addition to the foregoing, during operation in the generating mode, the contacts K4a–K4c are closed so that the AC loads receive the AC power on the AC bus 44. The power developed by the PMG 42 must be sufficient at low operating frequencies and voltages to perform the worst case de-ice function. As frequency and voltage increase, the thermally controlled loads have an increasing off-time to maintain the de-ice condition.

It should be noted that the power switches Q3 and Q4 can be operated in a pulse-width modulated mode of operation or in a quasi square wave mode of operation to convert the DC voltage appearing across the DC conductors 60 and 62 into regulated 28 volt DC power for the battery 54 and the loads on the DC load bus 52.

A comparison of FIG. 2 with FIG. 1 illustrates the advantages of the present invention. The starting/generating system 40 of FIG. 2 requires only one generator, which is inherently more reliable than the two electromagnetic machines 16 and 22 of FIG. 1 alone or in combination. Further, only one gear box pad is required. In addition, the permanent magnet generator 42 does not utilize brushes, which are a high maintenance item, and overall weight is reduced.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights of all modifications which come within the scope of the appended claims are reserved.

I claim:

1. A starting/generating system for use with a prime mover and operable in a starting mode to start the prime mover and further operable in a generating mode to develop power for loads, comprising:

a permanent magnet generator (PMG) having a motive power shaft coupled to the prime mover and further having a winding;

a bidirectional power converter having first and second inputs/outputs;

a DC power bus coupled to the power converter first input/output;

a DC power source coupled to the DC power bus;

an AC power bus coupled between the power converter second input/output and the PMG winding;

an AC load coupled to the AC power bus and receiving power from the PMG during operation in the generating mode; and a converter control coupled to the power converter wherein the converter control causes the power converter to convert power delivered by the DC power source to the DC power bus into power for the PMG during operation in the starting mode and which causes the power converter to convert power developed by the PMG on the AC power bus into power for the DC power bus during operation in the generating mode.

2. The starting/generating system of claim 1, wherein the power converter includes an inverter coupled to the PMG winding and a bidirectional DC-DC converter coupled between the inverter and the DC power bus.

3. The starting/generating system of claim 2, wherein the DC-DC converter comprises a transformer having first and second windings, a first pair of controllable power switches coupled to ends of the first winding, a second pair of controllable power switches coupled to ends of the second winding and diodes coupled across the controllable power switches.

4. The starting/generating system of claim 2, wherein the inverter includes controllable power switches coupled to the PMG winding and further coupled across DC conductors.

5. The starting/generating system of claim 1, further including contactors for selectively coupling the PMG to AC loads during operation in the generating mode.

6. The starting/generating system of claim 2, wherein the converter control comprises means for operating the DC-DC converter in a pulse-width modulated mode of operation.

7. The starting/generating system of claim 2, wherein the converter control comprises means for operating the DC-DC converter in a quasi square wave mode of operation.

8. A starting/generating system for use with an aircraft engine and operable in a starting mode to start the aircraft engine and further operable in a generating mode to develop power for aircraft loads, comprising:

a permanent magnet generator (PMG) having a motive power shaft coupled to the aircraft engine and further having a set of polyphase windings;

an AC load coupled to the set of polyphase windings and receiving AC power from the PMG during operation in the generating mode;

an inverter coupled to the set of PMG polyphase windings;

a bidirectional DC-DC converter coupled to the inverter;

a DC bus coupled to the DC-DC converter;

a battery coupled to the DC bus; and a converter control coupled to the inverter wherein the converter control causes the DC-DC converter and the inverter to convert DC power provided by the battery into AC power for the PMG during operation in the starting mode and which causes the inverter and the DC-DC converter to develop DC power for the power bus during operation in the generating mode.

9. The starting/generating system of claim 8, wherein the DC-DC converter comprises a transformer having first and second windings, a first pair of controllable power switches coupled to ends of the first winding, a second pair of controllable power switches coupled to ends of the second winding and diodes coupled across the controllable power switches.

10. The starting/generating system of claim 9, wherein the inverter includes controllable power switches coupled to the PMG winding and further coupled across DC conductors.

11. The starting/generating system of claim 10, further including contactors for selectively coupling the PMG to AC loads during operation in the generating mode.

12. The starting/generating system of claim 11, wherein the converter control comprises means for operating the DC-DC converter in a pulse-width modulated mode of operation.

13. The starting/generating system of claim 11, wherein the converter control comprises means for operating the DC-DC converter in a quasi square wave mode of operation.

14. A starting/generating system for use with an aircraft engine and operable in a starting mode to start the aircraft engine and further operable in a generating mode to develop power for aircraft loads, comprising:
- a permanent magnet generator (PMG) having a motive power shaft coupled to the aircraft engine and further having a set of polyphase windings;
- an inverter including controllable power switches coupled across DC conductors;
- a bidirectional DC-DC converter coupled to the DC conductors and comprising a transformer having first and second windings, a first pair of controllable power switches coupled to ends of the first winding, a second pair of controllable power switches coupled to ends of the second winding and diodes coupled across the controllable power switches;
- a DC bus coupled to the DC-DC converter;
- a battery coupled to the DC bus and developing a battery voltage;
- wherein the DC-DC converter steps up the battery voltage in the starting mode and produces a substantially constant DC voltage on the DC bus during operation in the generating mode;
- contactors coupled between the PMG and AC loads;
- means for closing the contactors during operation in the generating mode so that power developed by the PMG is delivered to the AC loads; and
- a converter control coupled to the inverter wherein the converter control causes the DC-DC converter and the inverter to convert DC power provided by the battery into AC power for the PMG during operation in the starting mode and which causes the inverter and the DC-DC converter to develop DC power for the power bus during operation in the generating mode.

15. The starting/generating system of claim 14, wherein the converter control comprises means for operating the DC-DC converter in a pulse-width modulated mode of operation.

16. The starting/generating system of claim 14, wherein the converter control comprises means for operating the DC-DC converter in a quasi square wave mode of operation.

* * * * *